United States Patent
Lee et al.

(10) Patent No.: US 11,757,173 B2
(45) Date of Patent: Sep. 12, 2023

(54) ELECTRONIC DISPLAY DEVICE

(71) Applicant: WISTRON NEWEB CORPORATION, Hsinchu (TW)

(72) Inventors: Hung-Wei Lee, Hsinchu (TW); Wen-Tsan Chung, Hsinchu (TW); Hsiang-Feng Hsieh, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 413 days.

(21) Appl. No.: 16/888,895

(22) Filed: Jun. 1, 2020

(65) Prior Publication Data
US 2021/0050653 A1    Feb. 18, 2021

(30) Foreign Application Priority Data

Aug. 15, 2019   (TW) .................................. 108129082

(51) Int. Cl.
*H01Q 1/44* (2006.01)
*H01Q 1/24* (2006.01)
*H01Q 1/22* (2006.01)
*G06F 1/16* (2006.01)

(52) U.S. Cl.
CPC ........... *H01Q 1/243* (2013.01); *G06F 1/1633* (2013.01); *H01Q 1/2266* (2013.01)

(58) Field of Classification Search
CPC ........ H01Q 1/243; H01Q 1/2266; H01Q 1/42; H01Q 1/48; H01Q 5/307; H01Q 21/28; H01Q 1/3283; G06F 1/1633
See application file for complete search history.

(56) References Cited

U.S. PATENT DOCUMENTS

| | | | | |
|---|---|---|---|---|
| 6,861,995 B2* | 3/2005 | Kuo | ........................ | H01Q 13/10 343/702 |
| 7,864,116 B2* | 1/2011 | Kurashima | ............ | H01Q 1/242 343/702 |
| 8,289,215 B2* | 10/2012 | Hsu | ....................... | H01Q 9/0421 343/702 |
| 8,344,954 B2* | 1/2013 | Cheng | .................. | H01Q 9/0421 343/702 |
| 8,562,163 B2* | 10/2013 | Lin | ....................... | H05K 9/0026 362/631 |
| 10,342,131 B1* | 7/2019 | Kim | ........................ | H05K 1/115 |
| 10,826,159 B2* | 11/2020 | Kim | .................. | B29C 45/14655 |

(Continued)

*Primary Examiner* — Hai V Tran
*Assistant Examiner* — Bamidele A Jegede
(74) *Attorney, Agent, or Firm* — McClure, Qualey & Rodack, LLP

(57) ABSTRACT

An electronic display device includes a frame assembly, a first antenna, a display module, and a metal grounding member. The frame assembly includes a housing body, and the housing body includes an inner side surface, an outer side surface corresponding to the inner side surface, and a groove running through the outer side surface and the inner side surface. The first antenna is disposed on the inner side surface of the housing body, and the first antenna includes a grounding portion. The display module is disposed on the outer side surface of the housing body. The metal grounding member is disposed on the outer side surface of the housing body, and the metal grounding member is disposed between the housing body and the display module. The metal grounding member is coupled to the grounding portion of the first antenna through the groove.

10 Claims, 16 Drawing Sheets

(56) References Cited

U.S. PATENT DOCUMENTS

| | | | | |
|---|---|---|---|---|
| 2002/0024469 | A1* | 2/2002 | Masaki | G06F 1/1683 343/702 |
| 2004/0183732 | A1* | 9/2004 | Konishi | G06F 1/1679 343/702 |
| 2005/0024573 | A1* | 2/2005 | Suzuki | G02F 1/133308 349/149 |
| 2007/0042644 | A1* | 2/2007 | Hsieh | H01R 13/6581 439/607.01 |
| 2007/0290943 | A1* | 12/2007 | Fujimoto | H01Q 1/325 343/872 |
| 2010/0061040 | A1* | 3/2010 | Dabov | H04M 1/026 361/679.01 |
| 2010/0073240 | A1* | 3/2010 | Cheng | H01Q 9/0421 343/846 |
| 2011/0043971 | A1* | 2/2011 | Jorgensen | G06F 1/1616 361/679.01 |
| 2011/0090632 | A1* | 4/2011 | Raff | H05K 5/0243 361/679.55 |
| 2011/0234098 | A1* | 9/2011 | Lin | H05K 9/0026 315/85 |
| 2012/0050114 | A1* | 3/2012 | Li | H01Q 1/44 343/702 |
| 2012/0112969 | A1* | 5/2012 | Caballero | H01Q 1/243 343/702 |
| 2012/0182190 | A1* | 7/2012 | Yui | H01Q 1/50 343/702 |
| 2012/0243161 | A1* | 9/2012 | Mizuno | G06F 3/03547 361/679.01 |
| 2013/0050046 | A1* | 2/2013 | Jarvis | H01Q 9/145 343/852 |
| 2013/0214986 | A1* | 8/2013 | Zhu | H01Q 1/243 343/866 |
| 2013/0217451 | A1* | 8/2013 | Komiyama | H04M 1/021 455/575.8 |
| 2013/0257659 | A1* | 10/2013 | Darnell | H05K 1/028 343/702 |
| 2014/0009344 | A1* | 1/2014 | Zhu | H01Q 1/2266 343/702 |
| 2014/0031093 | A1* | 1/2014 | Song | H04M 1/0249 455/575.1 |
| 2014/0185249 | A1* | 7/2014 | Chien | H05K 5/0278 361/736 |
| 2014/0320379 | A1* | 10/2014 | Hamabe | H01Q 1/523 343/893 |
| 2015/0043178 | A1* | 2/2015 | Peng | H05K 9/0032 361/752 |
| 2015/0091762 | A1* | 4/2015 | Hsiao | H01Q 1/243 343/702 |
| 2015/0155614 | A1* | 6/2015 | Youn | H04M 1/0202 343/702 |
| 2015/0171504 | A1* | 6/2015 | Hotta | H01Q 1/2266 343/702 |
| 2015/0207209 | A1* | 7/2015 | Martiskainen | H01Q 7/00 343/702 |
| 2016/0044801 | A1* | 2/2016 | Lee | H04M 1/0202 361/679.55 |
| 2016/0056527 | A1* | 2/2016 | Pascolini | H01Q 9/0485 343/702 |
| 2016/0128217 | A1* | 5/2016 | Yoo | H04M 1/0274 361/736 |
| 2017/0207516 | A1* | 7/2017 | Koo | H04M 1/0277 |
| 2017/0250460 | A1* | 8/2017 | Shin | H01Q 21/28 |
| 2017/0365911 | A1* | 12/2017 | Zachara | H01Q 1/243 |
| 2017/0365912 | A1* | 12/2017 | Su | H01Q 1/243 |
| 2018/0069588 | A1* | 3/2018 | Jiang | G06F 1/163 |
| 2018/0110143 | A1* | 4/2018 | Zhao | G06F 1/1684 |
| 2018/0175484 | A1* | 6/2018 | Tsai | H01Q 5/364 |
| 2018/0199472 | A1* | 7/2018 | Nakanishi | H01L 23/552 |
| 2018/0301799 | A1* | 10/2018 | Imai | H01Q 1/24 |
| 2018/0338021 | A1* | 11/2018 | Hebert | H04M 1/0277 |
| 2018/0351235 | A1* | 12/2018 | Wang | H01Q 21/28 |
| 2019/0027807 | A1* | 1/2019 | Choi | H05K 5/03 |
| 2019/0081386 | A1* | 3/2019 | Edwards | H01Q 5/328 |
| 2019/0081387 | A1* | 3/2019 | Pandya | H04L 69/18 |
| 2019/0115681 | A1* | 4/2019 | Jo | H01R 13/41 |
| 2019/0132973 | A1* | 5/2019 | Lee | H04M 1/0277 |
| 2019/0181564 | A1* | 6/2019 | Kwon | H01Q 1/16 |
| 2019/0207294 | A1* | 7/2019 | Yun | H01Q 1/243 |
| 2020/0150719 | A1* | 5/2020 | Abe | G06F 1/1616 |
| 2020/0225295 | A1* | 7/2020 | Hyun | H01R 12/79 |
| 2020/0235465 | A1* | 7/2020 | Yang | H01Q 1/243 |
| 2020/0344335 | A1* | 10/2020 | Lee | H04M 1/0274 |

* cited by examiner

ELECTRONIC DISPLAY DEVICE

CROSS-REFERENCE TO RELATED PATENT APPLICATION

This application claims the benefit of priority to Taiwan Patent Application No. 108129082, filed on Aug. 15, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a display, and in particular, to an electronic display device.

BACKGROUND OF THE DISCLOSURE

First, grounding portions of antenna structures are mostly directly connected to grounding layers of circuit boards in the related art, to achieve a grounding effect of the antenna structure. However, as an electronic product has increasingly more functions while needing to be smaller, an accommodating space of the electronic product for disposing components is reduced accordingly. Therefore, when being disposed in a same plane, a circuit board and an antenna structure are limited by space, resulting in a limitation on a manner in which a grounding portion of the antenna structure is connected to the circuit board, making it more difficult to control performance and/or a frequency offset of the antenna structure.

Therefore, how a structural design can be improved to enhance an adjustability of the performance and/or the frequency offset of the antenna structure so as to overcome the foregoing defect has become one of important issues to be resolved in the relevant field

SUMMARY OF THE DISCLOSURE

In response to the above-referenced technical inadequacies, the present disclosure provides an electronic display device.

To resolve the foregoing technical problem, a technical solution adopted in the present disclosure is to provide an electronic display device, including: a frame assembly, a first antenna, a display module, and a metal grounding member. The frame assembly includes a housing body, the housing body includes an inner side surface, an outer side surface corresponding to the inner side surface, and a groove running through the inner side surface and the outer side surface of the housing body. The first antenna is disposed on the inner side surface of the housing body, and the first antenna includes a grounding portion. The display module is disposed on the outer side surface of the housing body. The metal grounding member is disposed on the outer side surface of the housing body, and the metal grounding member is disposed between the housing body and the display module. The metal grounding member is coupled to the grounding portion of the first antenna through the groove.

A beneficial effect of the present disclosure resides in that, in the electronic display device provided in the present disclosure, by virtue of "the metal grounding member is coupled to the grounding portion of the first antenna through the groove" the metal grounding member disposed on the outer side surface of the housing body can be coupled to, through the groove, the grounding portion that is of the first antenna and that is disposed on the inner side surface of the housing body. Therefore, the groove is disposed, so that the first antenna and the metal grounding member can be respectively disposed on two opposite surfaces of the housing body, to fully use a spatial region of the outer side surface of the housing body. In addition, a feature of the first antenna can further be easily adjusted, to improve radiation efficiency of the first antenna.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
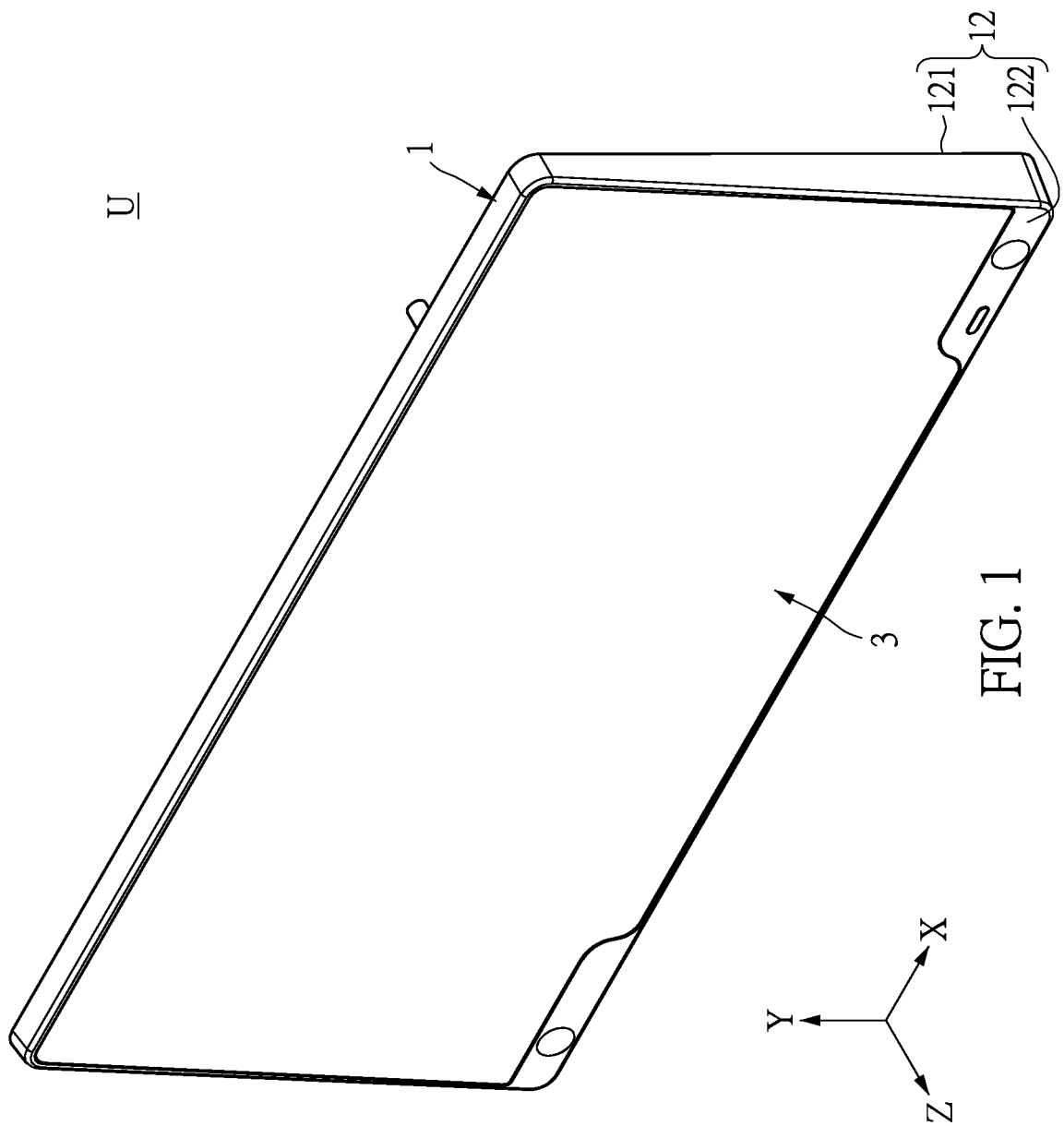
FIG. 1 is a schematic perspective assembled view of an electronic display device according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Embodiment

Figure 2:
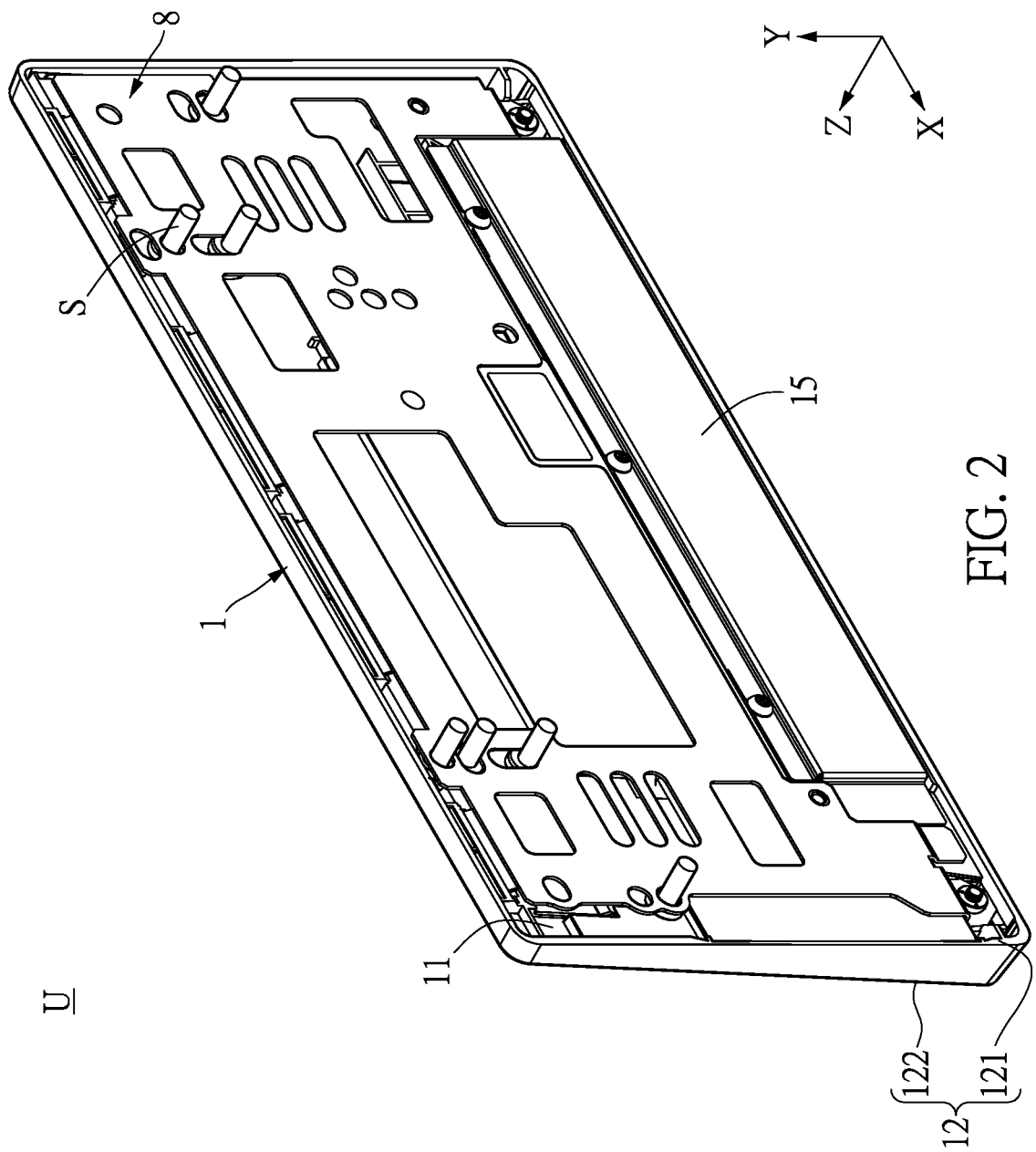
FIG. 2 is another schematic perspective assembled view of an electronic display device according to an embodiment of the present disclosure.
Figure 16:
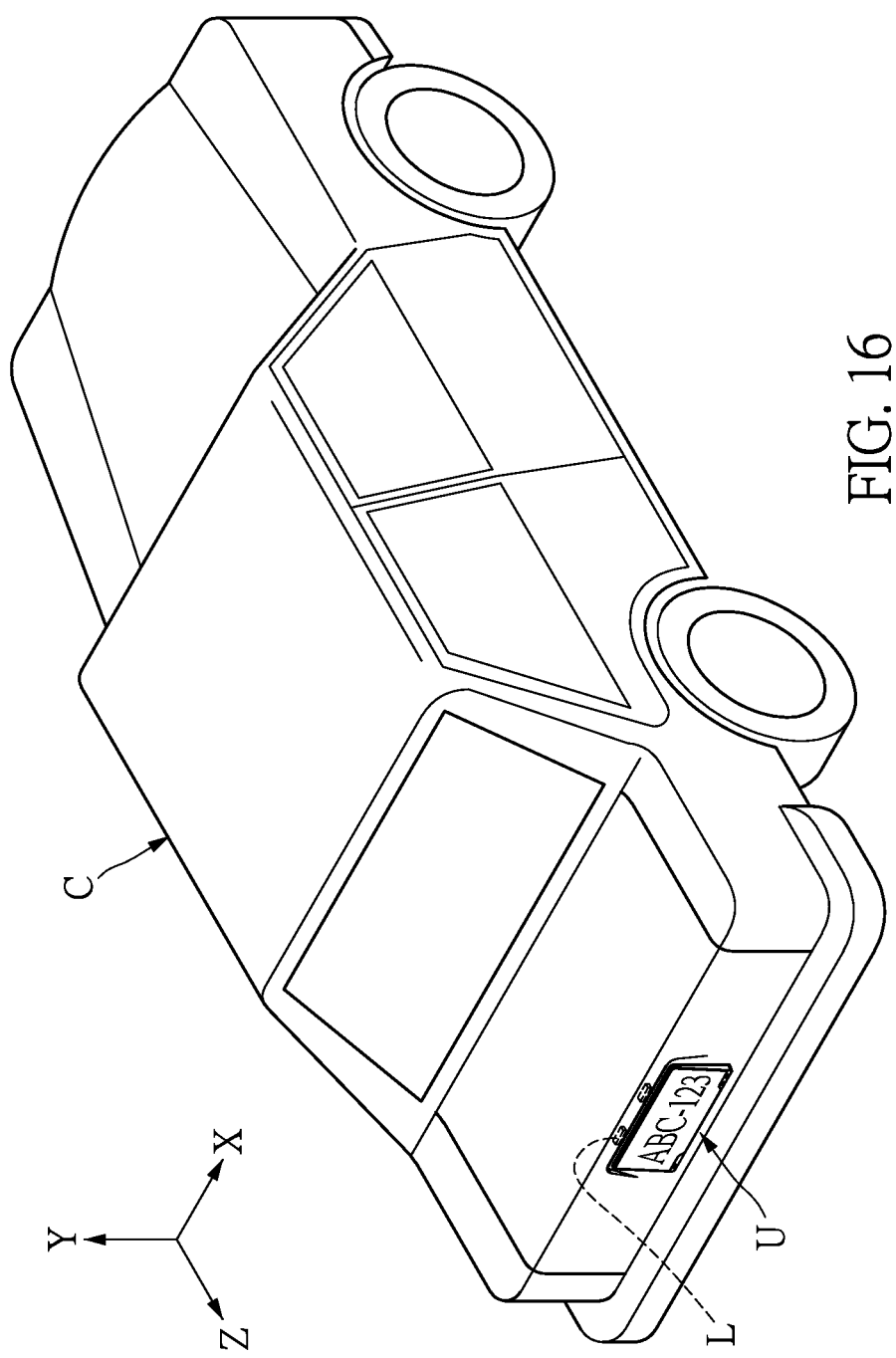
FIG. 16 is a schematic view of an electronic display device in use according to an embodiment of the present disclosure.

First, reference is made to FIG. 1, FIG. 2, and FIG. 16. FIG. 1 and FIG. 2 are each a schematic perspective assembled view of an electronic display device according to an embodiment of the present disclosure, and FIG. 16 is a schematic view of an electronic display device in use according to an embodiment of the present disclosure. This embodiment of the present disclosure provides an electronic display device U, including a frame assembly 1 and a display module 3 disposed on the frame assembly 1. The display module 3 may be configured to display information such as text or a mark. For example, the electronic display device U provided in this embodiment of the present disclosure may be preferably applied to an electronic vehicle license plate. Therefore, the display module 3 may be configured to display a vehicle license plate number or other information, but the present disclosure is not limited thereto. Further, the electronic display device U may further include a bracket 8, the bracket 8 may be disposed in a vehicle C by using a fixing member S (for example, but not limited to, a screw), and the frame assembly 1 on which the display module 3 is mounted may also be disposed on the bracket 8 by using the fixing member S. For example, when the electronic display device U provided in this embodiment of the present disclosure is applied to an electronic vehicle license plate disposed on the vehicle C, the bracket 8 may be first disposed on the vehicle C, and then, the frame assembly 1 on which the display module 3 is mounted is disposed on the bracket 8, but the present disclosure is not limited thereto. In addition, it should be noted that, the present disclosure is not limited in any particular scenario in which the electronic display device U can be applied.

Figure 3:
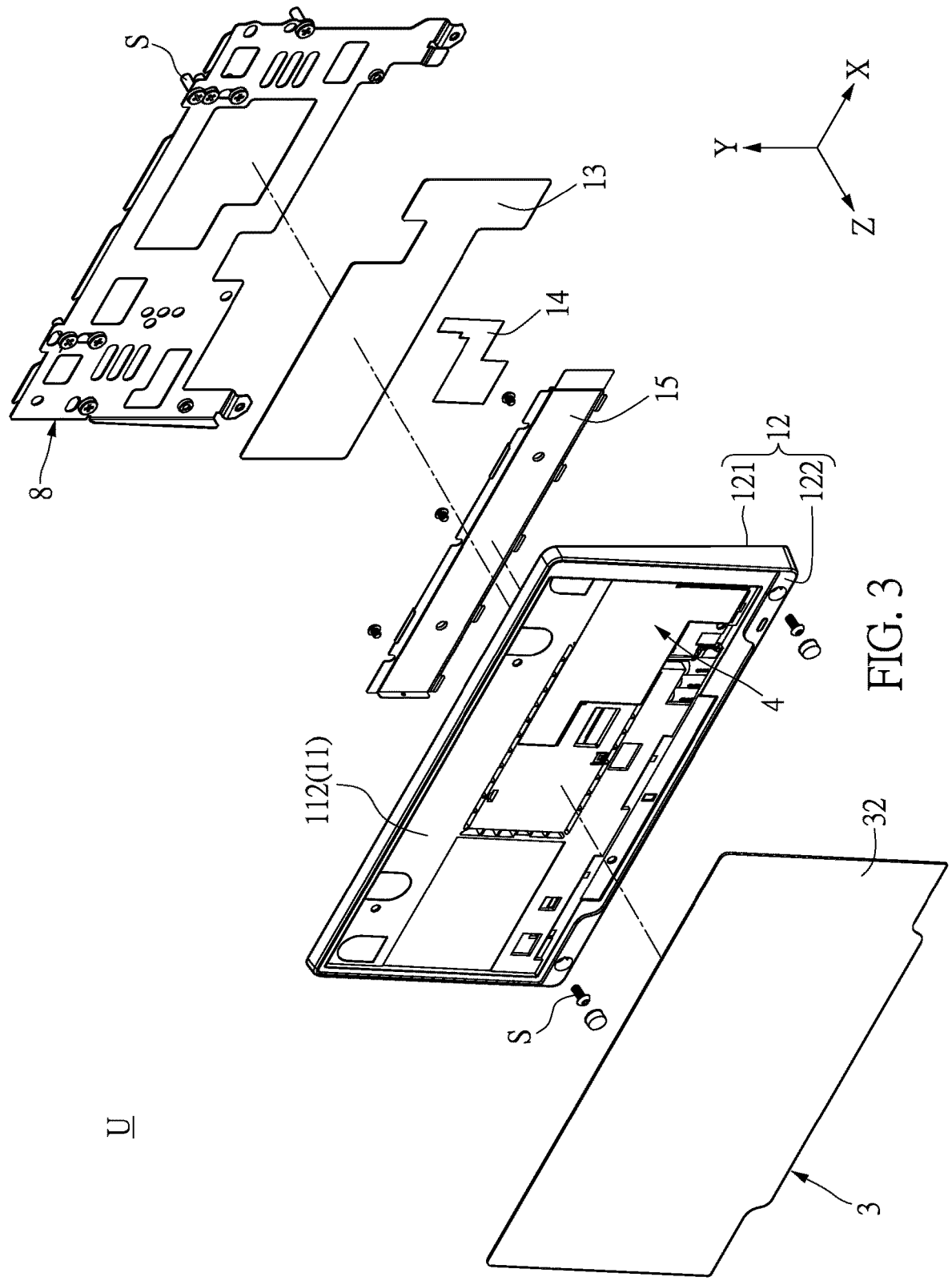
FIG. 3 is a schematic perspective exploded view of an electronic display device according to an embodiment of the present disclosure.
Figure 4:
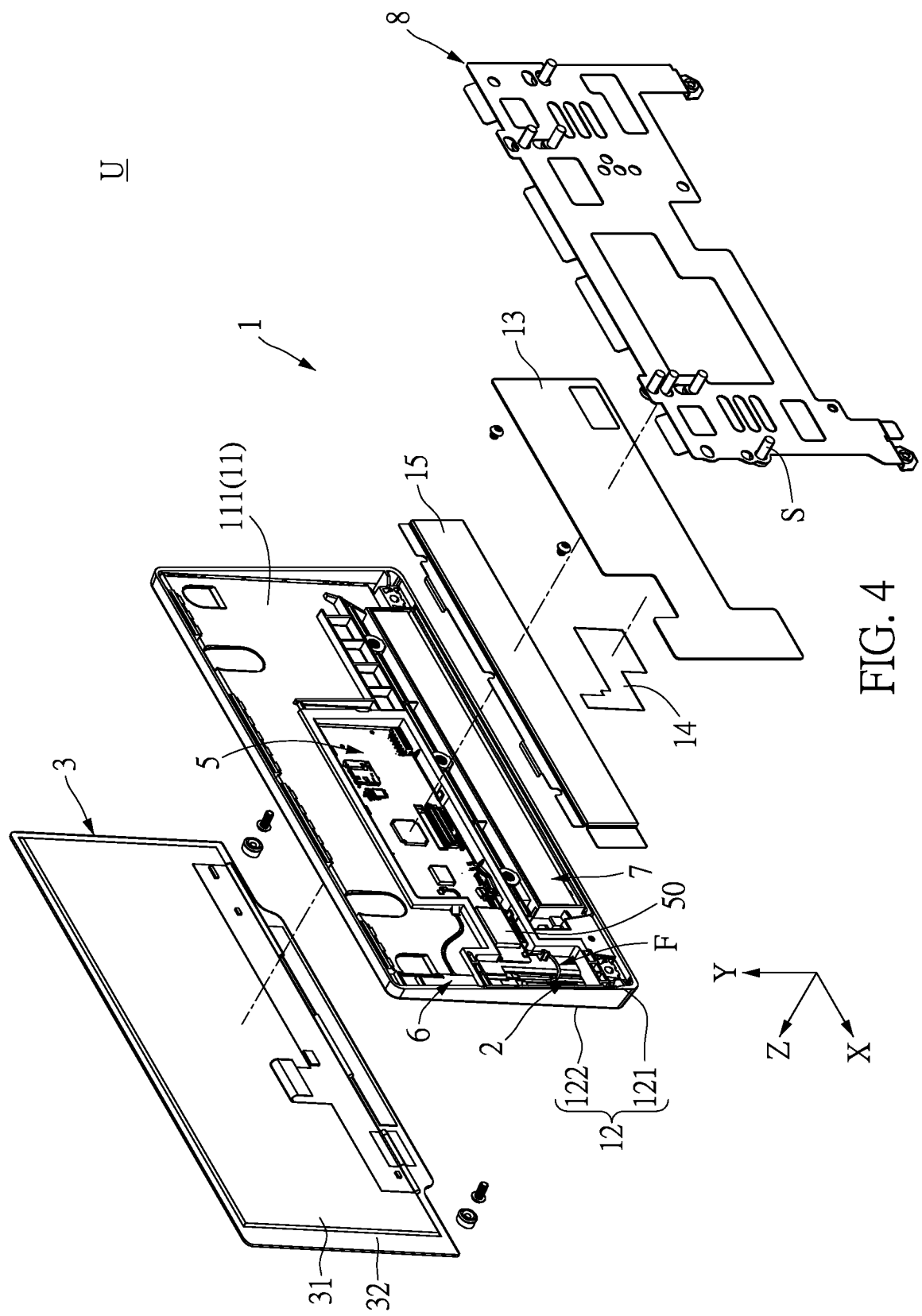
FIG. 4 is another schematic perspective exploded view of an electronic display device according to an embodiment of the present disclosure.
Figure 5:
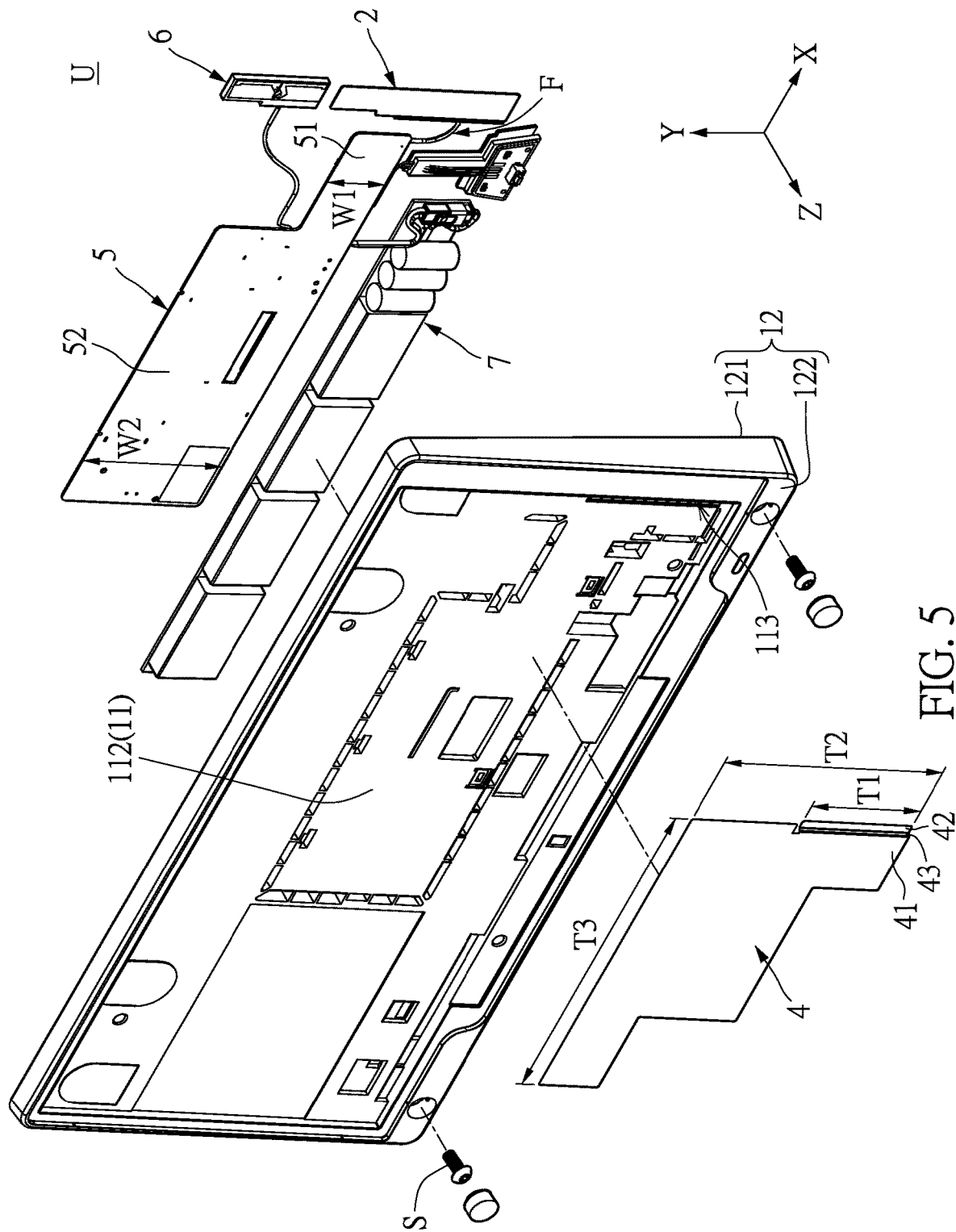
FIG. 5 is still another schematic perspective exploded view of an electronic display device according to an embodiment of the present disclosure.

Then, reference is made to FIG. 3 to FIG. 5. FIG. 3 to FIG. 5 are each a schematic perspective exploded view of an electronic display device according to an embodiment of the present disclosure. The electronic display device U may further include a first antenna 2 and a metal grounding member 4, and the first antenna 2 and the metal grounding member 4 may be disposed on the frame assembly 1. The first antenna 2 can receive information from a signal receiving and sending apparatus (for example, but not limited to, a base station or another apparatus such as a smartphone), and transmit the information from the signal receiving and sending apparatus to the electronic display device U, so that a required information is displayed on the display module 3. In addition, the metal grounding member 4 may be used as a grounding member (reference ground) of the first antenna 2. In addition, the electronic display device U may further include a circuit board assembly 5, the first antenna 2 and the display module 3 may be coupled to the circuit board assembly 5, and the circuit board assembly 5 may be disposed on the frame assembly 1. In addition, for example, the circuit board assembly 5 may be a printed circuit board assembly (PCBA) on which a plurality of chips and a plurality of computing units are disposed, and the display module 3 may be a display that uses an electronic ink (E-Ink) to present an image or a liquid crystal display (LCD), but the present disclosure is not limited thereto. Moreover, it should be particularly noted that coupling in the entire present disclosure may mean a direct connection or an indirect connection, a direct electrical connection or an indirect electrical connection, or a wireless communication connection, but the present disclosure is not limited thereto.

Based on the above, the electronic display device U may further include a second antenna 6, and the second antenna 6 may be coupled to the circuit board assembly 5, to provide a signal receiving and sending function. In addition, the first antenna 2 is capable of generating a first operating frequency band, and the second antenna 6 is capable of generating a second operating frequency band, where the first operating frequency band and the second operating frequency band are different from each other. For example, the first antenna 2 may be an antenna applied to an operating frequency band in a long term evolution (LTE) technology, and the second antenna 6 may be an antenna applied to an operating frequency band in Bluetooth®, but the present disclosure is not limited thereto. In addition, for example, the first antenna 2 may be an inverted-F antenna (IFA), and the second antenna 6 may be a dipole antenna, but the present disclosure is not limited thereto. Further, the electronic display device U may further include a power supply module 7, the power supply module 7 may be disposed on the frame assembly 1, and the power supply module 7 may be coupled to the circuit board assembly 5, the first antenna 2, the second antenna 6, and/or the display module 3 for supplying power. For example, the power supply module 7 is a battery and a wire group thereof, but the present disclosure is not limited thereto.

Then, referring to FIG. 1 to FIG. 5 again, the frame assembly 1 may include a housing body 11 and a frame body 12, the frame body 12 may be connected to the housing body 11, and the frame body 12 is circumferentially disposed around the housing body 11. For example, in terms of the present disclosure, the housing body 11 and the frame body 12 may be integrally formed, but the present disclosure is not limited thereto. In addition, the first antenna 2, the display module 3, the metal grounding member 4, the circuit board assembly 5, the second antenna 6, and the power supply module 7 may be disposed on the housing body 11, and the metal grounding member 4 may be disposed between the housing body 11 and the display module 3. In addition, an accommodation space (not labeled in the figure) can be formed between the frame body 12 and the housing body 11, for disposing the first antenna 2, the second antenna 6, the power supply module 7, and the circuit board assembly 5. Further, the first antenna 2 and the second antenna 6 may be preferably disposed close to the frame body 12, to prevent another component from blocking the first antenna 2 and the second antenna 6, and to further increase radiation efficiency of the first antenna 2 and the second antenna 6.

Based on the above, the housing body 11 may include an inner side surface 111 and an outer side surface 112 corresponding to the inner side surface 111, the first antenna 2, the second antenna 6, the circuit board assembly 5, and the power supply module 7 may be separately disposed on the inner side surface 111 of the housing body 11, the display module 3 and the metal grounding member 4 may be separately disposed on the outer side surface 112 of the housing body 11, and the metal grounding member 4 may be disposed between the outer side surface 112 of the housing body 11 and the display module 3. For example, the display module 3 may include a display panel 31 and a transparent cover plate 32, the cover plate 32 may be configured to protect the display panel 31, and the display panel 31 is disposed between the cover plate 32 and the housing body 11. Preferably, the metal grounding member 4 may be disposed between the outer side surface 112 of the housing body 11 and the display panel 31 of the display module 3. Further, a vertical projection of the first antenna 2 on the housing body 11 does not overlap a vertical projection of the display panel 31 of the display module 3 on the housing body 11. Therefore, the display panel 31 can be prevented from blocking the first antenna 2, thereby further increasing radiation efficiency of the first antenna 2. In addition, a vertical projection of the second antenna 6 on the housing body 11 does not overlap the vertical projection of the display panel 31 of the display module 3 on the housing body 11. Therefore, the display panel 31 can be prevented from blocking the second antenna 6, thereby further increasing radiation efficiency of the second antenna 6. In addition, it should be noted that, a manner in which the first antenna 2, the second antenna 6, the circuit board assembly 5, the power supply module 7, the display module 3, and the metal grounding member 4 are disposed on the frame assembly 1 may be a fixing manner such as adhesion or screw locking, but the present disclosure is not limited thereto. Further, when the electronic display device U provided in this embodiment of the present disclosure is applied to the electronic vehicle license plate disposed on the vehicle C, the inner side surface 111 may face toward the vehicle C, the outer side surface 112 may face away from the vehicle C, and the direction in which the inner side surface 111 faces is opposite to the direction in which the outer side surface 112 faces.

Based on the above, the frame assembly 1 may further include a first cover body 13, a second cover body 14, and a third cover body 15. The first cover body 13 may be disposed on the housing body 11 and disposed corresponding to positions of the first antenna 2 and the circuit board assembly 5, to cover and/or package the first antenna 2 and the circuit board assembly 5. The second cover body may be disposed on the housing body 11 and disposed corresponding to a position of the second antenna 6, to cover and/or package the second antenna 6. The third cover body 15 may be disposed on the housing body 11 and disposed corresponding to a position of the power supply module 7, to cover and/or package the power supply module 7. Therefore, the first cover body 13, the second cover body 14, and the third cover body 15 are disposed, to prevent moisture or dust from affecting the first antenna 2, the circuit board assembly 5, the second antenna 6, and the power supply module 7. In addition, it should be noted that, although the first cover body 13, the second cover body 14, and the third cover body 15 in the figure are described by using a cover body structure as an example, in other implementations, the first cover body 13, the second cover body 14, and the third cover body 15 may alternatively be formed by using a colloid to fill and cover the positions where the first antenna 2 is disposed, the circuit board assembly 5, the second antenna 6, and the power supply module 7. The present disclosure is not limited by a forming manner of the first cover body 13, the second cover body 14, and the third cover body 15.

Figure 6:
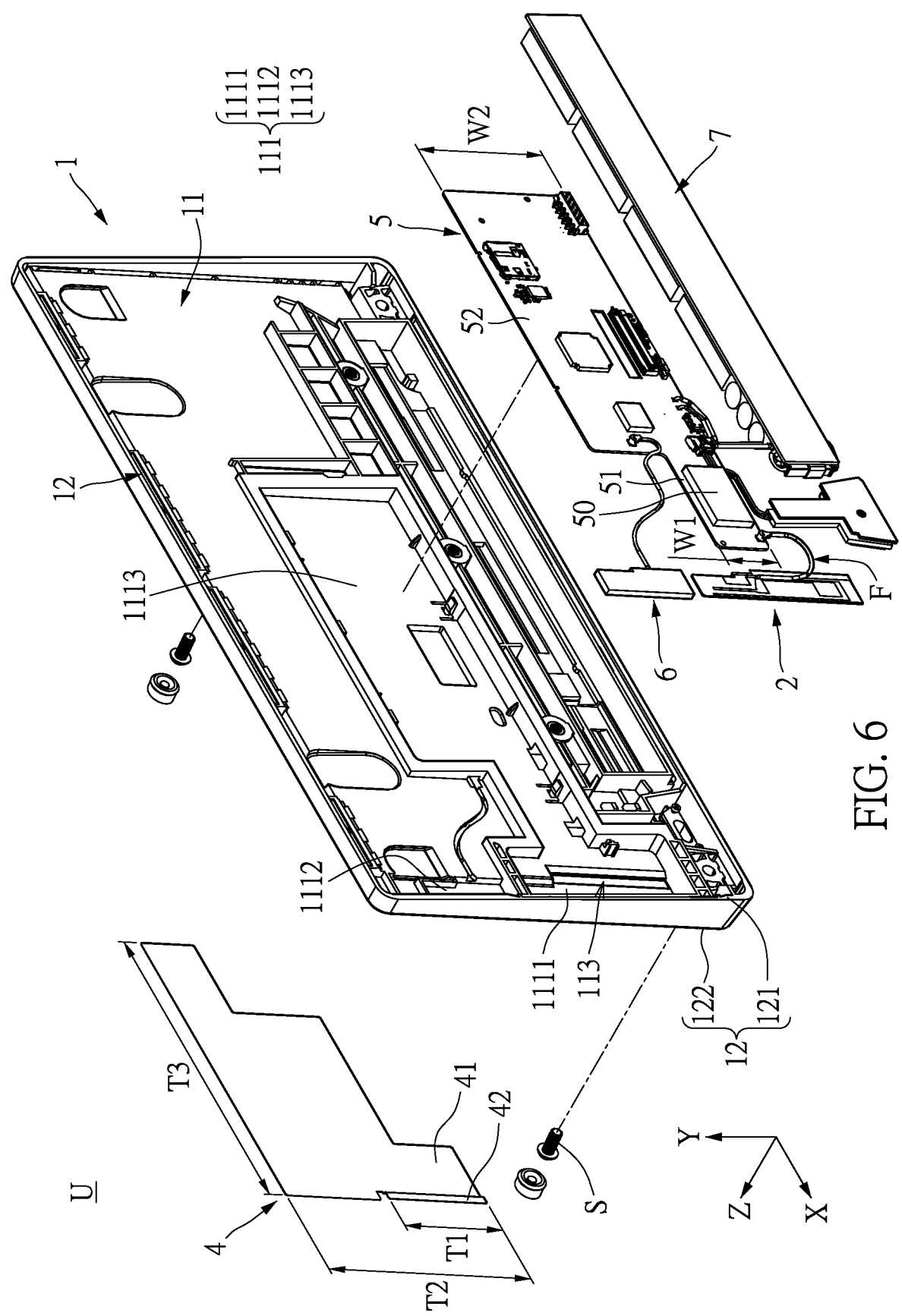
FIG. 6 is yet another schematic perspective exploded view of an electronic display device according to an embodiment of the present disclosure.
Figure 7:
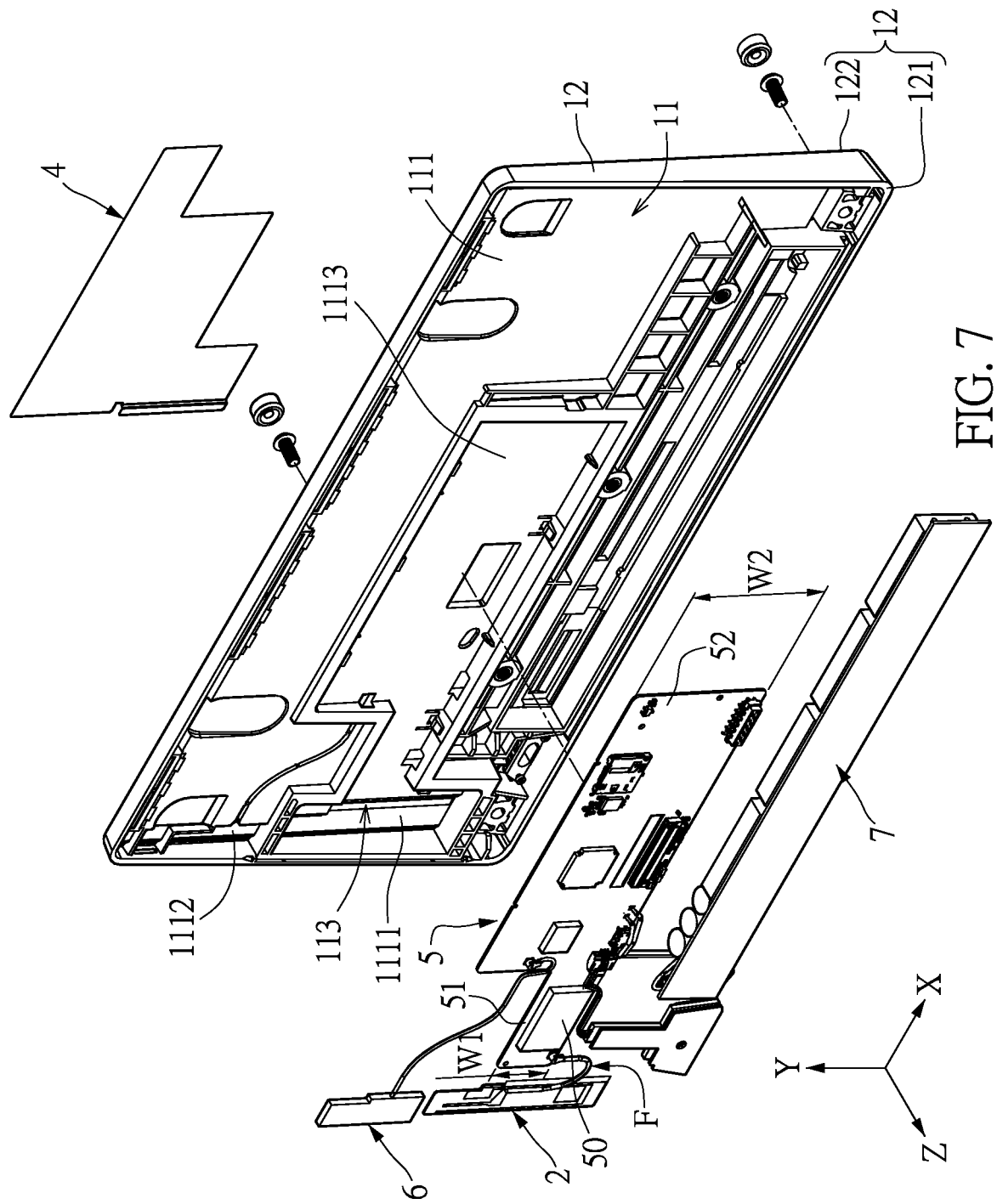
FIG. 7 is still yet another schematic perspective exploded view of an electronic display device according to an embodiment of the present disclosure.
Figure 8:
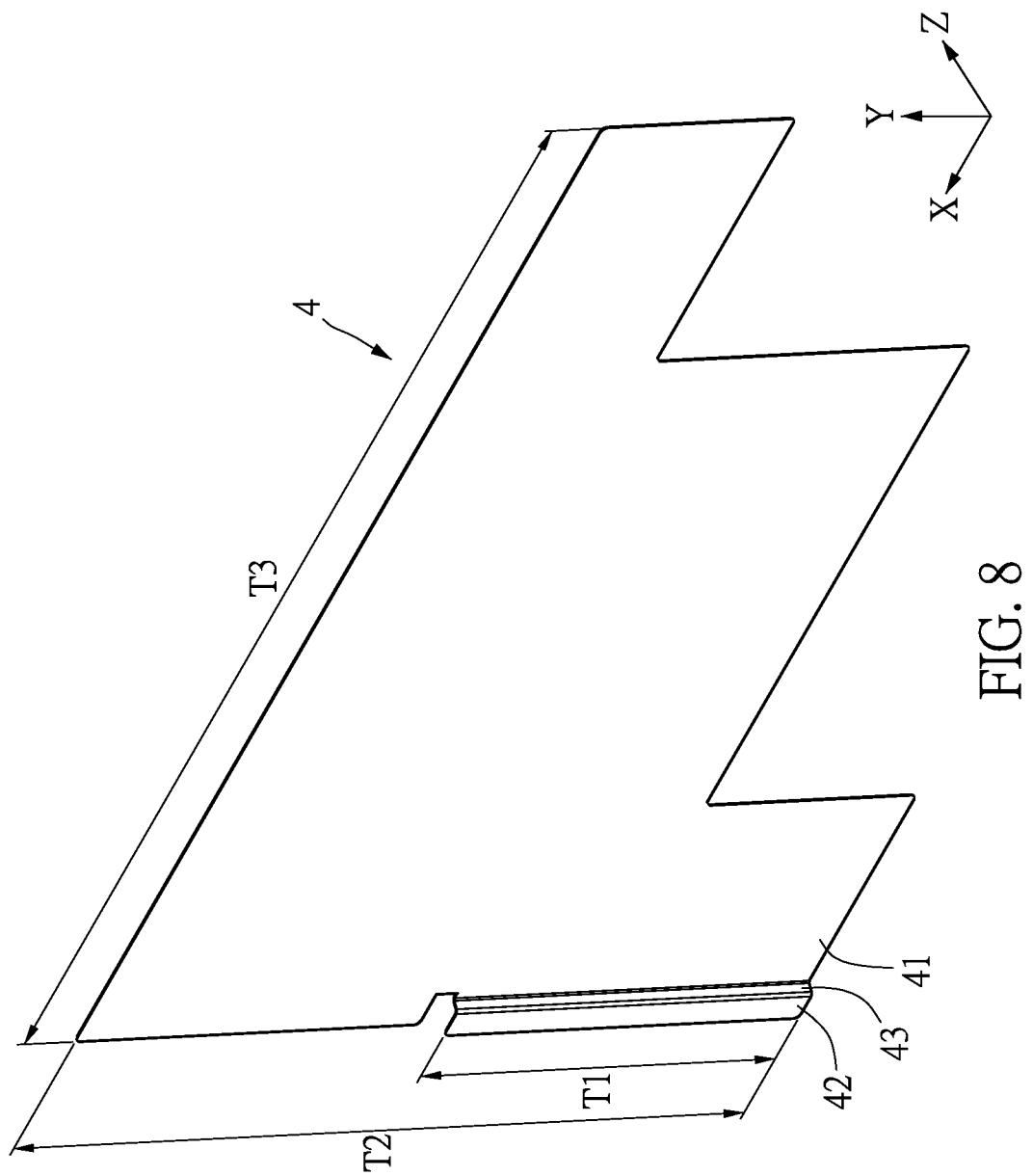
FIG. 8 is a schematic view of a metal grounding member.
Figure 9:
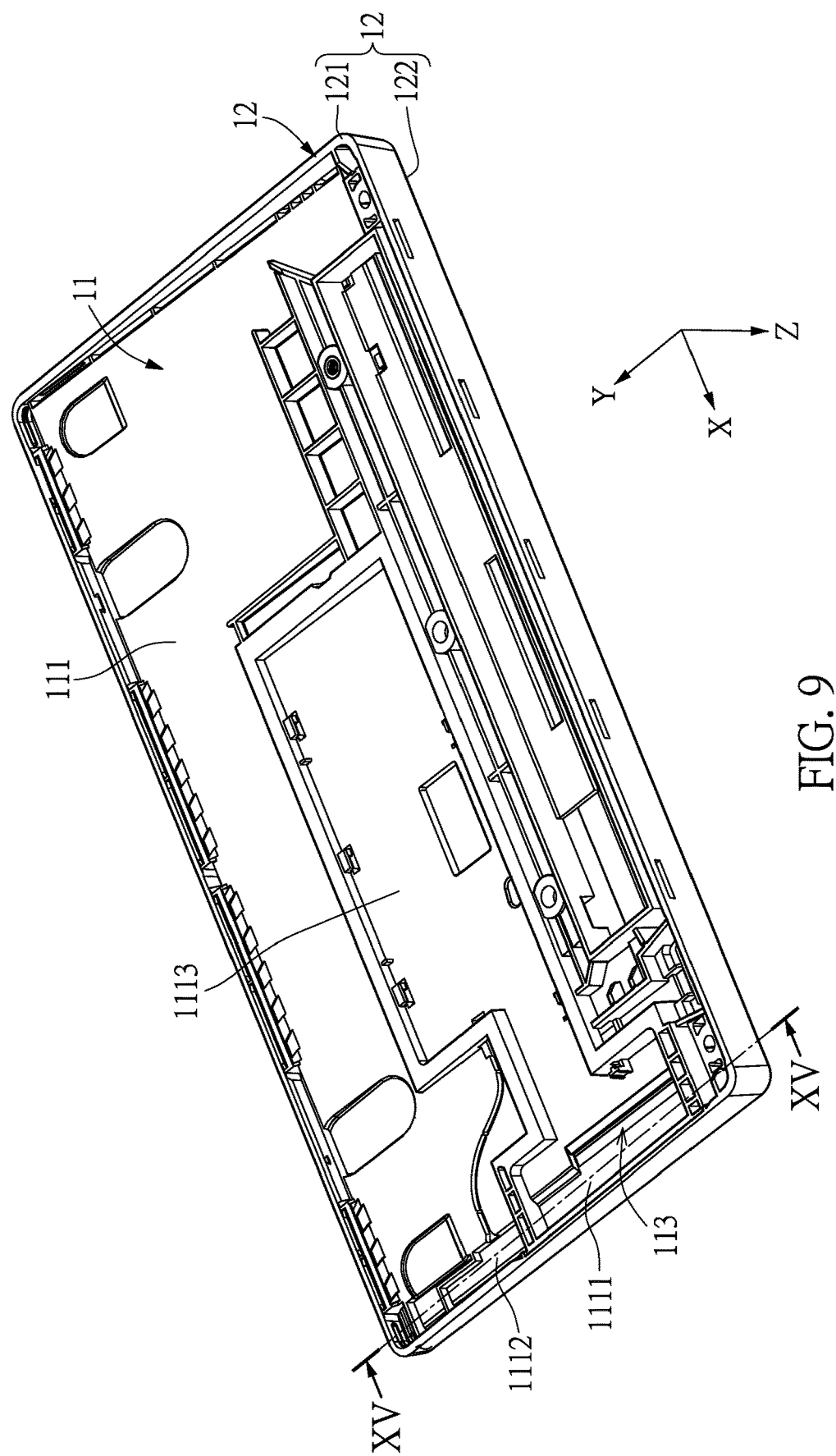
FIG. 9 is a schematic perspective view of a frame assembly of an electronic display device according to an embodiment of the present disclosure.
Figure 10:
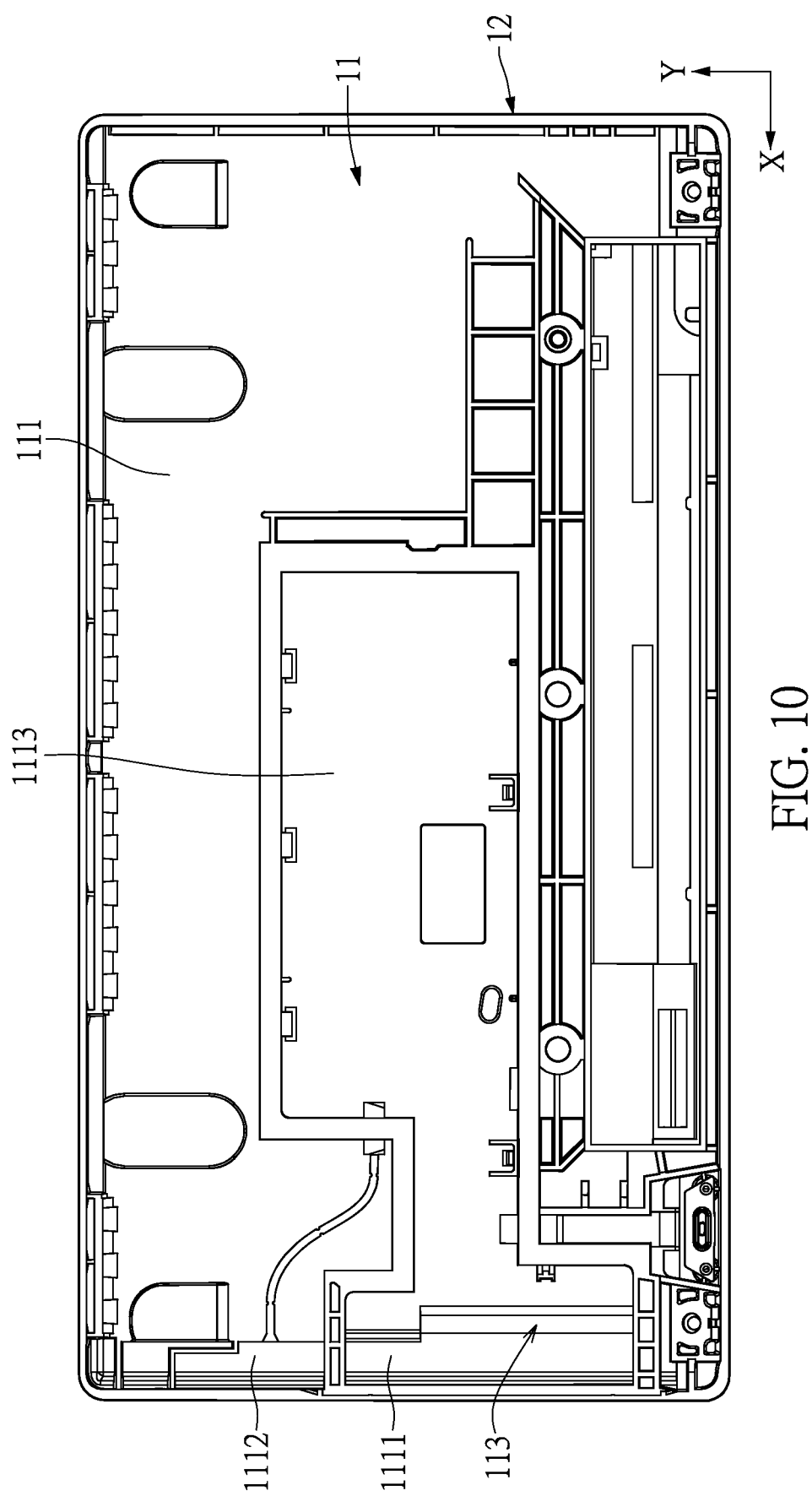
FIG. 10 is a schematic front view of a frame assembly of an electronic display device according to an embodiment of the present disclosure.
Figure 11:
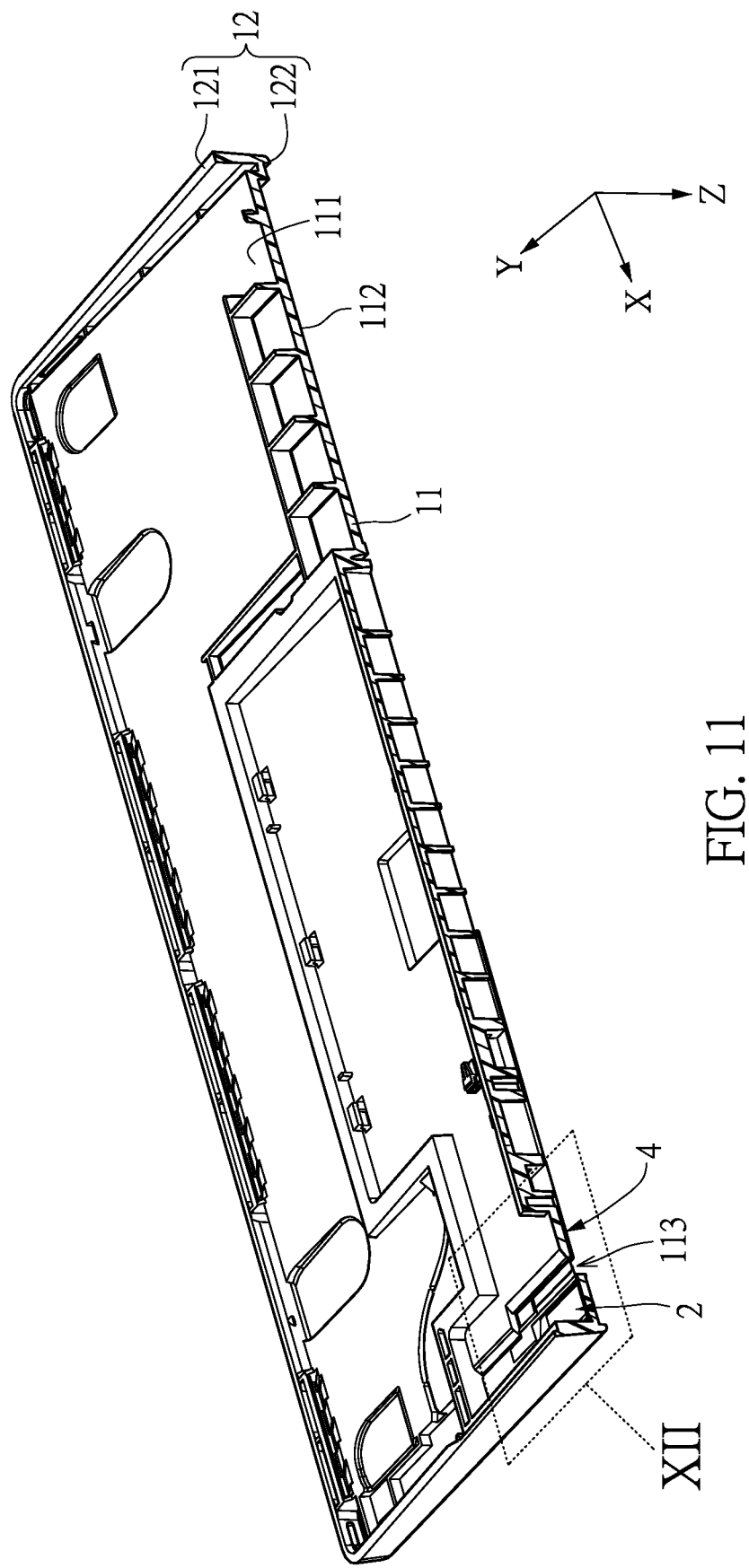
FIG. 11 is a schematic sectional view of a frame assembly.
Figure 12:
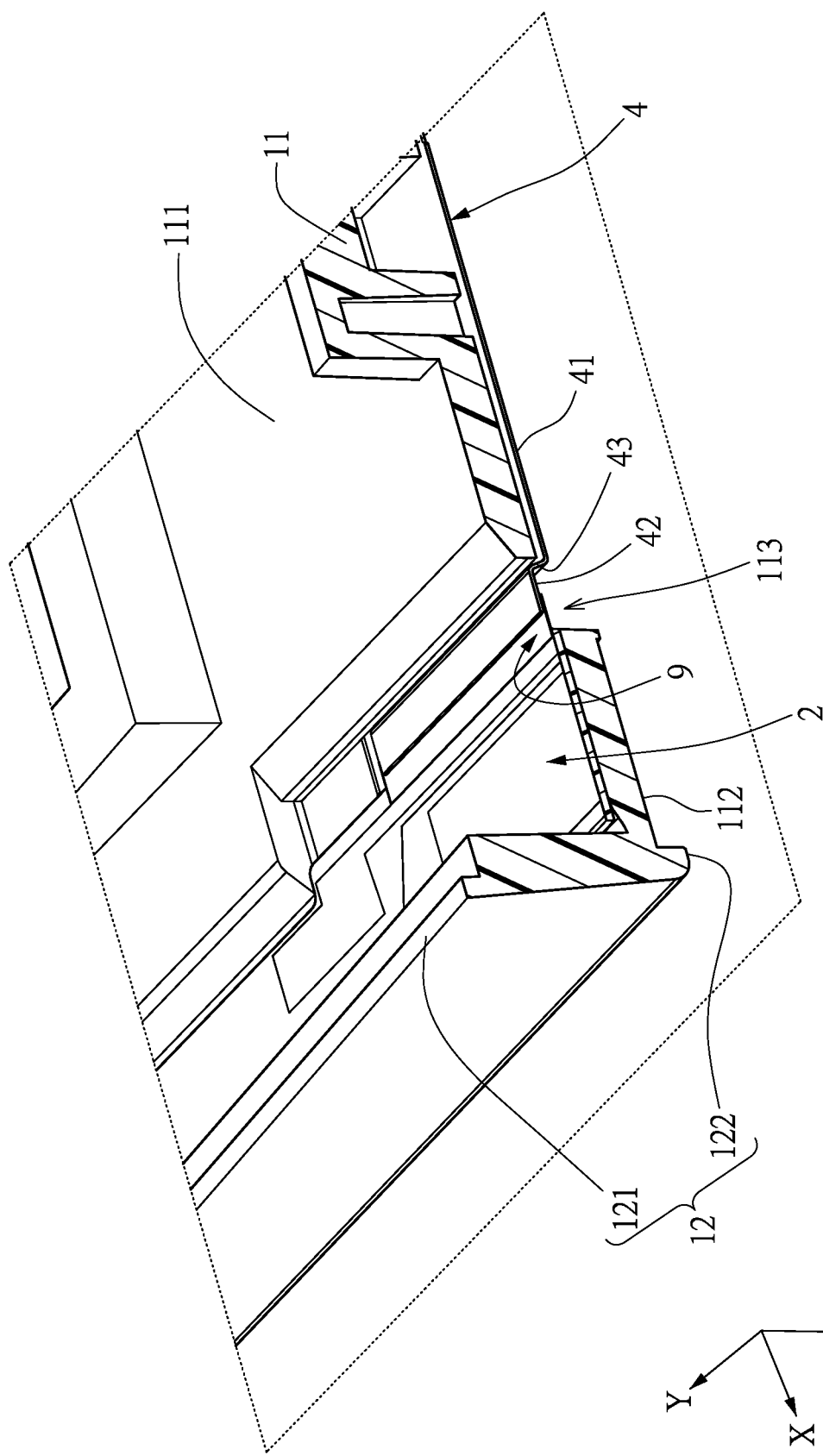
FIG. 12 is a schematic enlarged view of a section XII in FIG. 11.
Figure 13:
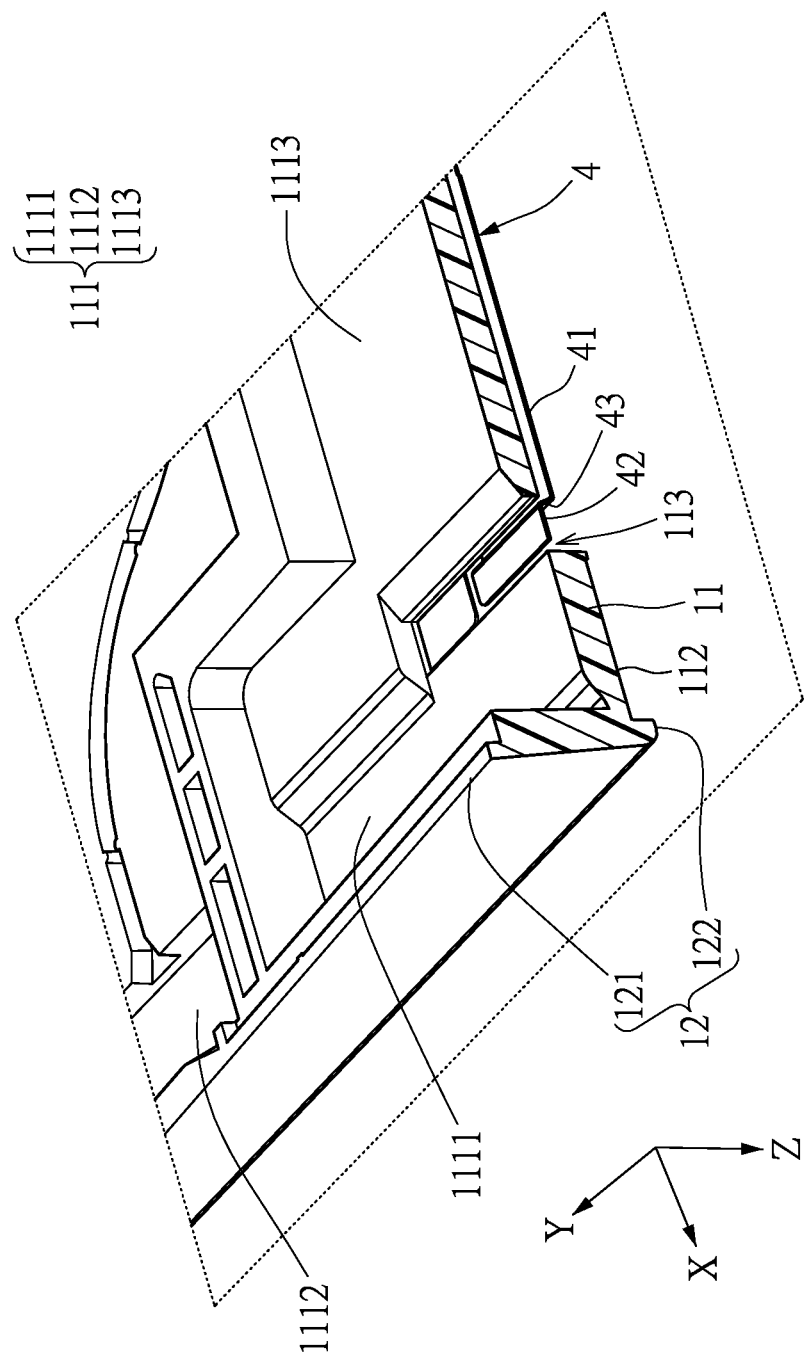
FIG. 13 is a schematic enlarged view of a frame assembly and a metal grounding member in the section XII in FIG. 11.
Figure 14:
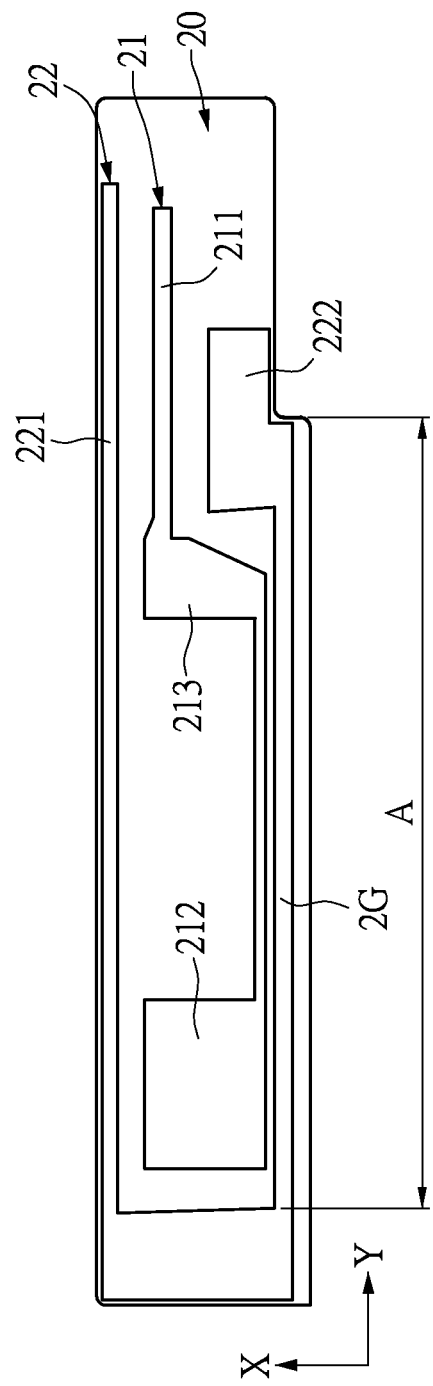
FIG. 14 is a schematic top view of a first antenna.

Then, reference is made to FIG. 6 to FIG. 14. FIG. 6 to FIG. 8 are each a schematic perspective exploded view of an electronic display device according to an embodiment of the present disclosure, FIG. 9 and FIG. 11 are each a schematic view of a frame assembly, FIG. 12 and FIG. 13 are each a schematic enlarged view, and FIG. 14 is a schematic top view of a first antenna. Specifically, the housing body 11 may further include a groove 113 running through the inner side surface 111 and the outer side surface 112 of the housing body 11, and the metal grounding member 4 disposed on the outer side surface 112 of the housing body 11 may be coupled, through the groove 113, to a grounding portion 2G of the first antenna 2 disposed on the inner side surface 111 of the housing body 11. Therefore, the groove 113 is disposed, so that the first antenna 2 and the metal grounding member 4 can be respectively disposed on two opposite surfaces of the housing body 11, to fully utilize a spatial region of the outer side surface 112 of the housing body 11.

Based on the above, the inner side surface 111 of the housing body 11 may include a first inner side face 1111, a second inner side face 1112, and a third inner side face 1113, the first antenna 2 may be disposed on the first inner side face 1111, the second antenna 6 may be disposed on the second inner side face 1112, and the circuit board assembly 5 may be disposed on the third inner side face 1113. In addition, the groove 113 may be disposed between the first inner side face 1111 and the third inner side face 1113, in other words, the groove 113 may be located between the first antenna 2 and the circuit board assembly 5.

Based on the above, the circuit board assembly 5 may include a first board body 51 and a second board body 52 connected to the first board body 51, and the first board body 51 is closer to the first antenna 2 than the second board body 52. In other words, the first board body 51 may be located between the second board body 52 and the first antenna 2, and the first board body 51 is closer to the groove 113 than the second board body 52. In addition, the first board body 51 may have a first predetermined width W1, and the second board body 52 may have a second predetermined width W2, where the first predetermined width W1 is less than the second predetermined width W2. In addition, the first predetermined width W1 of the first board body 51 is a maximum width of the first board body 51. Further, the metal grounding member 4 may include a body portion 41, a coupling portion 42 coupled to the grounding portion 2G, and a connection portion 43 connected between the body portion 41 and the coupling portion 42. The coupling portion 42 that is of the metal grounding member 4 and that is coupled to the grounding portion 2G of the first antenna 2 may have a first preset width T1, and the body portion 41 of the metal grounding member 4 may have a second preset width T2, where the second preset width T2 may be greater than the first preset width T1, and the first preset width T1 of the metal grounding member 4 may be greater than the first predetermined width W1 of the first board body 51. In addition, in other implementations, the grounding portion 2G of the first antenna 2 may also have a preset width A, and the preset width A of the grounding portion 2G of the first antenna 2 may be greater than the first predetermined width W1 of the first board body 51, but the present disclosure is not limited thereto. In other implementations, the preset width A of the grounding portion 2G of the first antenna 2 may alternatively be equal to or less than the first preset width T1 of the coupling portion 42 of the metal grounding member 4. Further, the metal grounding member 4 may include a long side edge, the long side edge of the metal grounding member 4 may have a preset length T3, and the long side edge is a maximum length of the metal grounding member 4. In addition, magnitude of the preset length T3 of the long side edge may be greater than or equal to ¼ times a wavelength corresponding to a lowest operating frequency of the first antenna 2. It should be noted that, in terms of the present disclosure, the long side edge of the metal grounding member 4 in the figure may extend along an X direction, but the present disclosure is not limited thereto. In other implementations, if the second preset width T2 is greater than the preset length T3, the long side edge extends along a Y direction, and the second preset width T2 of the long side edge may be greater than or equal to ¼ times the wavelength corresponding to the lowest operating frequency of the first antenna 2. For example, because an operating frequency band of the first antenna 2 is applied to LTE, the first antenna 2 is capable of generating an operating frequency band between 698 MHz to 960 MHz and an operating frequency band between 1,425 MHz to 2,690 MHz. Therefore, a size of the long side edge may be calculated by using the lowest operating frequency of the first antenna 2, that is, calculated by using 698 MHz.

Based on the above, a vertical projection of the metal grounding member 4 on the housing body 11 at least partially overlaps a vertical projection of the circuit board assembly 5 on the housing body 11, and the vertical projection of the metal grounding member 4 on the housing body 11 at least partially overlaps a vertical projection of the display panel 31 on the housing body 11. Therefore, the metal grounding member 4 may be used as a shielding structure of the circuit board assembly 5, to prevent the circuit board assembly 5 from interfering with the display panel. Further, the circuit board assembly 5 may include a radio frequency chip 50, the vertical projection of the metal grounding member 4 on the housing body 11 overlaps a vertical projection of the radio frequency chip 50 on the housing body 11, and the metal grounding member 4 is disposed between the display panel 31 of the display module 3 and the radio frequency chip 50. In addition, it should be noted that, although the vertical projection of the metal grounding member 4 on the housing body 11 does not completely overlap the vertical projection of the circuit board assembly 5 on the housing body 11 in the figure, in other implementations, the vertical projection of the metal grounding member 4 on the housing body 11 may alternatively completely overlap the vertical projection of the circuit board assembly 5 on the housing body 11, and a projection area of the vertical projection of the metal grounding member 4 on the housing body 11 is greater than a projection area of the vertical projection of the circuit board assembly 5 on the housing body 11.

Based on the above, referring to FIG. 2 and FIG. 6 to FIG. 14 again, a material of the bracket 8 is metal. Therefore, in terms of the present disclosure, a vertical projection of the bracket 8 on the housing body 11 does not overlap a vertical projection of the first antenna 2 on the housing body 11. Therefore, the bracket 8 having a metal material may be prevented from interfering with the first antenna 2, thereby further increasing radiation efficiency of the first antenna 2. Further, the vertical projection of the bracket 8 on the housing body 11 does not overlap the vertical projection of a second antenna 6 on the housing body 11. Therefore, the bracket 8 having a metal material may be prevented from interfering with the second antenna 6, thereby further increasing radiation efficiency of the second antenna 6. In addition, for example, a material of the housing body 11 may not be metal to avoid interference to the first antenna 2 and the second antenna 6.

Then, referring to FIG. 8, FIG. 9, and FIG. 12 to FIG. 14 again, the metal grounding member 4 may include a body portion 41, a coupling portion 42 coupled to a grounding portion 2G, and a connection portion 43 connected between the body portion 41 and the coupling portion 42. In addition, the body portion 41 may be disposed on the outer side surface 112 of the housing body 11, and at least a part of the coupling portion 42 and at least a part of the connection portion 43 are located in a groove 113. Therefore, the metal grounding member 4 disposed on the outer side surface 112 of the housing body 11 may be coupled, through the groove 113, to the grounding portion 2G of the first antenna 2 disposed on the inner side surface 111 of the housing body 11. Further, the connection portion 43 may be bent relative to the body portion 41, and the connection portion 43 may be bent relative to the coupling portion 42, so that at least a part of the coupling portion 42 and at least a part of the connection portion 43 extend toward a direction of the groove 113 and are located in the groove 113.

Based on the above, the electronic display device U may further include a bridge member 9, the bridge member 9 may be disposed between the metal grounding member 4 and the grounding portion 2G, and the bridge member 9 may be coupled to the metal grounding member 4 and the grounding portion 2G. In other words, the coupling portion 42 of the metal grounding member 4 and the grounding portion 2G of the first antenna 2 may be coupled to each other through the bridge member 9. In addition, for example, the bridge member 9 may be a conductor, and a purpose of including the bridge member 9 is to enable the metal grounding member 4 and the grounding portion 2G of the first antenna 2 to be easily connected to each other. Although, as described in the implementation in the figures, the bridge member 9 may further be included, in other implementations, the bridge member 9 may alternatively not be included. In addition, it should be noted that, for example, a material of the bridge member 9 may be tin or other conductive materials, but the present disclosure is not limited thereto.

Based on the above, as shown in FIG. 7 and FIG. 14, the first antenna 2 may include a substrate 20, a first radiation member 21 disposed on the substrate 20, and a second radiation member 22 disposed on the substrate 20. In addition, in the implementation of the first antenna 2 in FIG. 14, the first radiation member 21 may include a first radiation portion 211, a second radiation portion 212, and a feeding portion 213 coupled between the first radiation portion 211 and the second radiation portion 212. The second radiation member 22 may include a third radiation portion 221, a fourth radiation portion 222, and a grounding portion 2G coupled between the third radiation portion 221 and the fourth radiation portion 222. Further, a feeding member F may be coupled to the first antenna 2 for feeding a signal, the feeding member F may be a coaxial cable, the feeding member F may have a feeding end (not labeled in the figure) and a grounding end (not labeled in the figure), the feeding end may be coupled to the first radiation member 21, and the grounding end may be coupled to the second radiation member 22. The feeding member F may be coupled between the feeding portion 213 and the grounding portion 2G, the feeding end of the feeding member F may be coupled to the feeding portion 213, and the grounding end of the feeding member F may be coupled to the grounding portion 2G. In addition, the coupling portion 42 of the metal grounding member 4 may be coupled to the grounding portion 2G of the second radiation member 22. Preferably, the coupling portion 42 of the metal grounding member 4 and the grounding portion 2G may be connected to each other by using the bridge member 9. However, it should be noted that, an architecture of the first antenna 2 in the figures of the present disclosure is merely used as an example for description, and in other implementations, the first antenna 2 may alternatively have other architectures. In addition, the manner in which the feeding member F feeds a signal is also merely an example for description, and the present disclosure is not limited thereto.

Then, referring to FIG. 1, FIG. 2, and FIG. 9 again, the frame body 12 of the frame assembly 1 may include an inner surface 121 facing an inner side direction and an outer surface 122 facing an outer side direction, and the outer side surface 112 of the housing body 11 faces the outer side direction. In addition, the frame body 12 may be a trapezoid shaped structure. Therefore, the inner surface 121 and the outer surface 122 of the frame body 12 may be inclined to each other. In other words, the frame body 12 may be gradually wider along a Y direction, that is, when the electronic display device U in the present disclosure is applied to the electronic vehicle license plate disposed on the vehicle C, a thickness of the frame body 12 close to (facing a positive Y direction) a position of the license plate lamp L (or may be referred to as a vehicle license plate lamp) of the vehicle C is narrower, and a thickness of the frame body 12 away from (facing a negative Y direction) the position of the license plate lamp L of the vehicle C is wider. In addition, the inner surface 121 of the frame body 12 may face toward the vehicle C, and the outer surface 122 of the frame body 12 may face away from the vehicle C.

Figure 15:
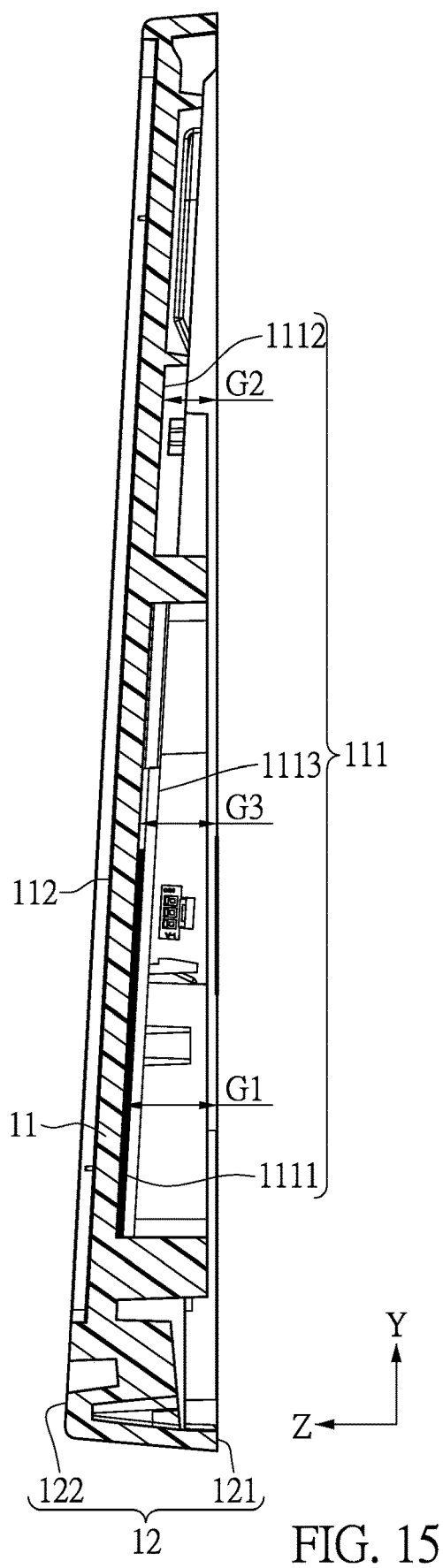
FIG. 15 is a schematic cross-sectional view taken along line XV-XV in FIG. 9.

Based on the above, reference is made to FIG. 15. FIG. 15 a schematic cross-sectional view taken along line XV-XV in FIG. 9. The housing body 11 may be inclined relative to a vertical plane perpendicular to a ground plane. Therefore, when the electronic display device U of the present disclosure is applied to an electronic vehicle license plate disposed behind the vehicle C as a rear license plate, the display panel 31 may be inclined, so that a license plate lamp L can project on the display panel 31. Further, in terms of the present disclosure, the inner surface 121 of the frame body 12 may be perpendicular to the ground plane, and the inner side surface 111 and the outer side surface 112 of the housing body 11 may be inclined relative to the inner surface 121. In addition, a first predetermined gap G1 exists between the first inner side face 1111 of the housing body 11 and the inner surface 121 of the frame body 12, and a second predetermined gap G2 exists between the second inner side face 1112 of the housing body 11 and the inner surface 121 of the frame body 12, where the first predetermined gap G1 may be greater than the second predetermined gap G2. In other words, because the housing body 11 is inclined relative to the vertical plane perpendicular to the ground plane, the first inner side face 1111 is farther away from the inner surface 121 of the frame body 12 than the second inner side face 1112. Further, because an operating frequency band of the first antenna 2 in this embodiment of the present disclosure is applied to LTE, and an operating frequency band of the second antenna 6 is applied to Bluetooth, metal of the vehicle C easily affects the first antenna 2. Therefore, the first antenna 2 disposed on the first inner side face 1111 may be located at a position farther away from the vehicle C than the second antenna 6 disposed on the second inner side face 1112. In addition, a third predetermined gap G3 may exist between the third inner side face 1113 of the housing body 11 and the inner surface 121 of the frame body 12, and the first predetermined gap G1 may be greater than the third predetermined gap G3. In other words, the first inner side face 1111 is farther away from the inner surface 121 of the frame body 12 than the third inner side face 1113.

Beneficial Effect of the Embodiments

A beneficial effect of the present disclosure resides in that, in the electronic display device U provided in the present disclosure, a technical solution in which "the metal grounding member 4 is coupled to the grounding portion 2G of the first antenna through the groove" can be used, to enable the metal grounding member 4 disposed on the outer side surface 112 of the housing body 11 to be coupled to, through the groove 113, the grounding portion 2G of the first antenna 2 disposed on the inner side surface 111 of the housing body 11. Therefore, the groove 113 is disposed, so that the first antenna 2 and the metal grounding member 4 can be respectively disposed on two opposite surfaces of the housing body 11, to fully use the spatial region of the outer side surface 112 of the housing body 11. In addition, a feature of the first antenna 2 can further be easily adjusted, to improve radiation efficiency of the first antenna 2.

Further, because the metal grounding member 4 is disposed on the outer side surface 112 of the housing body 11, when fewer components are disposed on the outer side surface 112 than on the inner side surface 111, a shape of the metal grounding member 4 may be easily adjusted based on practical requirement, without being easily limited by positions where other components are disposed.

In addition, a vertical projection of the metal grounding member 4 on the housing body 11 at least partially overlaps a vertical projection of the circuit board assembly 5 on the housing body 11, and the vertical projection of the metal grounding member 4 on the housing body 11 at least partially overlaps a vertical projection of the display panel 31 on the housing body 11. Therefore, the metal grounding member 4 may be used as the shielding structure of the circuit board assembly 5, to prevent the circuit board assembly 5 from interfering with the display panel. In terms of this embodiment of the present disclosure, the metal grounding member 4 is disposed only at a position corresponding to an electronic component that is more likely to interfere with the display module 3 in the circuit board assembly 5, to reduce costs and bring about a beneficial result. For example, in terms of the present disclosure, the circuit board assembly 5 may include a radio frequency chip 50, and an electronic component that is more likely to cause noise interference to the display module 3 may be an electronic component having a relatively high frequency, for example, but not limited to, the radio frequency chip 50 (or a radio frequency circuit). For example, in terms of the present disclosure, the electronic component having a relatively high frequency may be an LTE radio frequency chip coupled to the first antenna 2 or a Bluetooth radio frequency chip coupled to the second antenna 6. In other words, the vertical projection of the metal grounding member 4 on the housing body 11 overlaps a vertical projection of the radio frequency chip 50 that is more likely to cause noise interference to the display module 3 in the circuit board assembly 5 on the housing body 11, so that the radio frequency chip 50 of the circuit board assembly 5 can be prevented from interfering with the display module 3.

In addition, the present disclosure may be preferably applied in a case where a width of a ground layer of the circuit board assembly 5 is less than a first preset width T1 of the coupling portion 42 of the metal grounding member 4 or a width of a ground layer of the circuit board assembly 5 is less than a preset width of the grounding portion 2G of the first antenna 2. Therefore, the inclusion of the groove 113 may enable a grounding portion 2G having a default width A in the first antenna 2 to be coupled to the coupling portion having a similar size and a first preset width T1 in the metal grounding member 4, to avoid affecting performance of the first antenna 2. In other words, in terms of the related art, to reduce the number of components being disposed, usually, the grounding portion 2G of the first antenna 2 is directly coupled to the grounding portion of the first board body 51, so that the grounding portion 2G having a wider distance is coupled to the first board body 51 having a narrower distance. However, consequently, a grounding feature from the grounding portion 2G of the first antenna 2 to the grounding portion of the first board body 51 is wide to narrow, affecting an original antenna feature. However, in the present disclosure, the first antenna 2 and the metal grounding member 4 are respectively disposed on two opposite surfaces of the housing body 11, so that a grounding feature from the grounding portion 2G of the first antenna 2 to the metal grounding member 4 coupled to the grounding portion 2G is narrow to wide, that is, from the first preset width T1 to the second preset width T2. Therefore, the present disclosure can have an advantage of improving an antenna feature, for example, but not limited to, improving impedance matching.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An electronic display device, comprising:
a frame assembly including a housing body, wherein the housing body has an inner side surface, an outer side surface corresponding to the inner side surface, and a groove running through the inner side surface and the outer side surface of the housing body;
a first antenna disposed on the inner side surface of the housing body, wherein the first antenna includes a grounding portion;
a display module disposed on the outer side surface of the housing body;
a metal grounding member disposed on the outer side surface of the housing body, wherein the metal grounding member is disposed between the housing body and the display module, and the metal grounding member is coupled to the grounding portion of the first antenna through the groove; and
a second antenna,
wherein the frame assembly further includes a frame body, the frame body is connected to the housing body, and the frame body is circumferentially disposed around the housing body; the frame body includes an inner surface facing an inner side direction and an outer surface facing an outer side direction, and the outer side surface of the housing body faces the outer side direction; and the inner surface and the outer surface are inclined to each other,
wherein the second antenna is disposed on the inner side surface of the housing body, and the second antenna is coupled to a circuit board assembly; the inner side surface of the housing body has a first inner side face and a second inner side face, the first antenna is disposed on the first inner side face, and the second antenna is disposed on the second inner side face; and a first predetermined gap exists between the first inner side face and the inner surface of the frame body, and a second predetermined gap exists between the second inner side face and the inner surface of the frame body, wherein the first predetermined gap is greater than the second predetermined gap.

2. The electronic display device according to claim 1, wherein the first antenna is coupled to the circuit board assembly; and a vertical projection of the metal grounding member on the housing body at least partially overlaps a vertical projection of the circuit board assembly on the housing body, and the metal grounding member is disposed between the display module and the circuit board assembly.

3. The electronic display device according to claim 2, wherein the circuit board assembly includes a radio frequency chip, the vertical projection of the metal grounding member on the housing body overlaps a vertical projection of the radio frequency chip on the housing body, and the metal grounding member is disposed between the display module and the radio frequency chip.

4. The electronic display device according to claim 1, wherein the first antenna is capable of generating a first operating frequency band, and the second antenna is capable of generating a second operating frequency band.

5. The electronic display device according to claim 1, wherein the metal grounding member has a body portion, a coupling portion coupled to the grounding portion, and a connection portion connected between the body portion and the coupling portion; and the body portion is disposed on the outer side surface of the housing body, and at least a part of the coupling portion and at least a part of the connection portion are located in the groove.

6. The electronic display device according to claim 1, wherein the inner side surface of the housing body further has a third inner side face, and the circuit board assembly is disposed on the third inner side face; and the groove is disposed between the first inner side face and the third inner side face, and the first inner side face is farther away from the inner surface of the frame body than the third inner side face.

7. The electronic display device according to claim 1, wherein a vertical projection of the first antenna on the housing body does not overlap a vertical projection of a display panel of the display module on the housing body.

8. The electronic display device according to claim 1, further comprising a bracket, wherein the frame assembly is disposed on the bracket, and a vertical projection of the bracket on the housing body does not overlap a vertical projection of the first antenna on the housing body.

9. The electronic display device according to claim 1, wherein the circuit board assembly is disposed on the inner side surface of the housing body, the circuit board assembly includes a first board body, the first board body has a first predetermined width, and a coupling portion of the metal grounding member that is coupled to the grounding portion has a preset width, wherein the preset width is greater than the first predetermined width.

10. The electronic display device according to claim 1, wherein the metal grounding member includes a long side edge, and the long side edge has a size greater than or equal to ¼ times a wavelength corresponding to a lowest operating frequency of the first antenna.

\* \* \* \* \*